350-174.

12-11-73 XR 3,778,548

United States Patent [19]

Nistri

[11] 3,778,548

[45] Dec. 11, 1973

[54] OPTICAL APPARATUS FOR COLLIMATION TO INFINITY OF TWO LUMINOUS IMAGES WHOSE FREQUENCIES FALL WITHIN DIFFERENT SPECTRAL BANDS

[75] Inventor: Raffaello Nistri, Rome, Italy

[73] Assignee: Ottico Meccanica Italiana-OMI-S.p.A., Rome, Italy

[22] Filed: Sept. 6, 1972

[21] Appl. No.: 286,776

[52] U.S. Cl. ................ 178/7.88, 178/7.85, 350/174

[51] Int. Cl. ........................ G02b 27/10, H01j 29/89

[58] Field of Search ................ 178/7.88, 7.83, 7.84, 178/7.89, 7.85; 350/174, 172, 170, 173

[56] References Cited

UNITED STATES PATENTS

| | | | |
|---|---|---|---|
| 3,589,796 | 6/1971 | Schaefer | 350/174 |
| 3,711,826 | 1/1973 | La Russa | 178/7.88 |

*Primary Examiner*—Howard W. Britton
*Attorney*—Richard K. Stevens et al.

[57] ABSTRACT

An optical display apparatus for use in an aircraft includes a cathode ray tube operating with one color display on the screen thereof and another source of visual information operating with another colour. These two information sources are displayed to an observer after collimation to superimpose the information on a distant scene.

The visual signal from the cathode ray tube is reflected by a dichroically treated surface and the visual signal from the second source is refracted by the same dichroic surface and reflected by a second surface at an angle with the dichroic surface. Both visual signals are then displayed superimposed on a semitransparent imaging means.

The second source is located between the cathode ray tube and the imaging means and on the same side with respect to the dichroic filter as the cathode ray tube and the imaging means.

6 Claims, 2 Drawing Figures

Figure 1:
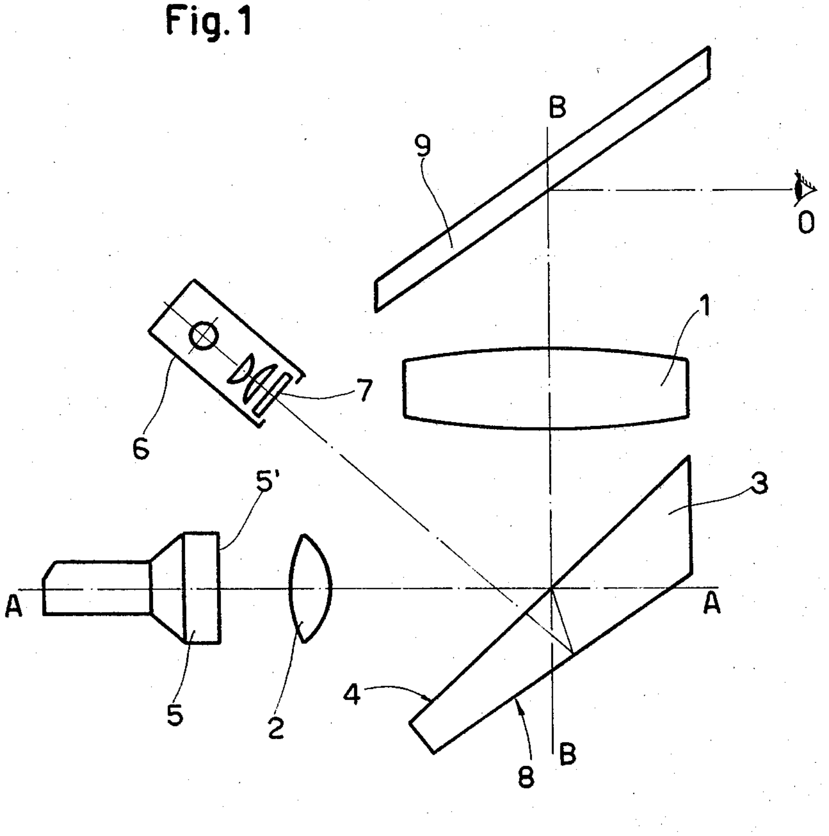

OPTICAL APPARATUS FOR COLLIMATION TO INFINITY OF TWO LUMINOUS IMAGES WHOSE FREQUENCIES FALL WITHIN DIFFERENT SPECTRAL BANDS

Apparatuses for the presentation of flight data on semi-transparent imaging means, particularly for utilization on aircraft, are well known. In aeronautical terminology these apparatuses are known as "Head-up display" systems.

This invention, to be more precise, concerns the optical systems of apparatuses of this type, destined for the projection to infinity on semi-transparent imaging means of data for aerial navigation, for take off and landing maneuvers and for aiming of launchable and droppable weapons from aircraft.

The data required for the above mentioned flight and aiming operations are elaborated by an on-board calculator which supplies them to a cathode ray tube upon whose screen the data themselves appear in visual form. By means of an optical system the image thus generated by the cathode ray tube is projected to infinity upon the semi transparent imaging glass, to give the observer a simultaneous view of the image itself and of a distant scene.

In current practice, this equipment is completed by a normal projector which generated the image of a reticule which is composed of geometric elements related to the axes of reference of the aircraft. The supplementary image can be permanently superimposed upon the image generated by the cathode ray tube, which we shall designate as the primary image, or can replace it as required. In this latter case it is called "Stand-by-sight". When it is permanently superimposed on the primary image, it provides an indication as to the proper functioning of the cathode ray tube, since it has the capability of making evident any abnormal deviation of its image.

To permit the cathode ray tube image to be distinguished opon the imaging glass from that supplied by the projector, the two images are of a different color so as to create a good chromatic contrast between them; generally, the image originating at the cathode ray tube is green while that from the projector is red.

Equipment which satisfies, in a more or less adequate manner the requirements described above is already known.

However, it must be borne in mind that apparatuses of this kind are destined for use on aircraft in which the criteria of weight and especially of dimensions are of utmost importance. In the case of "Head-up-display" (HUD) type equipment, they are installed on board in a space in front of the pilot which must contain numerous instruments and which is conditioned by the requirement that there be no interference with external visibility.

Therefore, this invention proposes the realization of an optical system for the projection to infinity of images generated by the cathode ray tube and the "stand-by-sight" projector, which will occupy little space and have a form such as to produce a minimum of interference in the pilot's compartment of an aircraft, while ensuring, nevertheless, a high degree of precision.

A novel means of reducing to a minimum the overall dimensions of the optical system is realized in this invention,in which the projector of the stand-by-sight image is situated in the position indicated in the figures, between the collecting lens 2 and the primary lens system 1. The invention is characterized by the location of the projector as indicated above, since its location requires double refraction of the rays generated by the projector itself through surface 4 (FIG.1) or 12 (FIG.2) which have been appropriately treated as described below.

FIG. 1 schematically illustrates the above mentioned arrangement, showing in their respective positions:

a cathode ray tube 5 upon whose screen appean in the form of geometric elements aiming and/or aircraft maneuvering data, and which is normally included in the electronic portion of the H UD system;

a collecting lens 2 whose optical axis coincides with axis A-A of the cathode tube;

a primary lens system 1 located in such a way as to receive the beam of rays reflected by surface 4 and to transmit it,as a beam of parallel rays, to the semi-transparent imaging glass 9;

a semitransparent glass plate 9 placed in such a way as to intercept the luminous beam originating at lens 1 and partially transmit it to the observer 0;

a projector 6 which generates supplementary image 7; this projector is located in an intermediate position between the cathode ray tube 5 and the imaging glass 9 on the same side as these with respect to the prism 3; the optical axis of the projector is almost in coincidence with the bisector of the angle included between axes AA and BB;

a prism 3 defined by two optical surfaces, one of which 4 is dichroically treated in such a way as to obtain reflection of the band of frequencies corresponding to the light coming from the cathode ray tube 5 and complete refraction of the light originating at projector 6 and which is situated so as to reflect towards lens system 1 along axis BB, the image originated by the cathode ray tube, while the other surface 8 is silver plated to completely reflect the luminous band coming from projector 6 and is oriented in such a way as to transmit it toward lens 1 in the direction of axis BB,so that the projection of image 7 is exactly superimposed on that of the image originating at the cathode ray tube.

Optical axes AA and BB lie in the same plane, which is the vertical plane of symmetry of the aircraft.

The semi-transparent glass 9 visually shows the two images superimposed at infinity.

To obtain this result, it is obviously necessary to respect the condition that the emittent surface 5′ coincides with the focal plane of the optical system constituted by lens 2 and lens system 1, and that the plane of image 7 of projector 6 coincides with the focal plane of the primary lens system 1 along an axis which is aprosimately perpendicular to surface 4 of prism 3.

Utilization of a prism 3 having a dichroic surface 4 in lieu of a dichroic filter whose surfaces are parallel permits installation of projector 6 in a position such as to contribute substantially to minimization of the size of the apparatus and to give the housing of the apparatus itself a most functional form.

Figure 2:
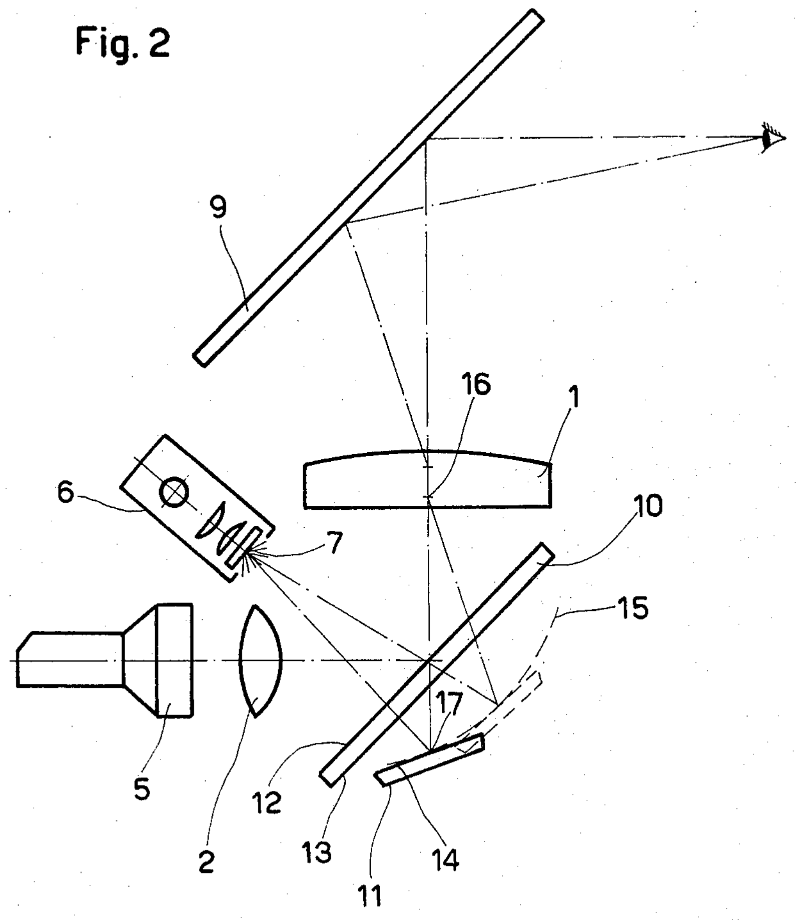

FIG. 2 illustrates a possible alternate embodiment of the same optical system which is useful when displacement of the superimposed image (red light) is required along a vertical line with respect to the horizon, passing through the center of the image of the cathode ray tube projected to infinity.

Prism 3 is replaced by two glass plates 10 and 11, shown in FIG.2. Surface 12 of plate 10 is dichroically treated in such a way as to obtain complete reflection of the frequency band emitted by the cathode ray tube, while surface 13 of this plate has been subjected to treatement to prevent reflection of the frequency band originating at projector 6.

Plate 11 whose surface 14 is silver-plated or otherwise treated in such a way as to reflect in its entirety the frequency band originating at projector 6, is mounted so that it can move along curve 15 which comprises a part of an ellipse whose foci coincide respectively with the center of the focal plane 7 of projector 6 and with the second nodal point 16 of primary lens system 1. Thus, the distance between focal plane 7, the point of incidence 17 and nodal point 16 will remain unchanged regardless of the position tangential to elliptical curve 15 assumed by plate 11; this ensures perfect focussing of the image emitted by projector 6 and prevents the formation of parallax between the two projected images.

Translation of the mirror 11 ensures the necessary displacement of the image reflected upon it along an axis which, to the observer, will appear vertical with respect to the horizontal.

WHAT IS CLAIMED IS:

1. An optical apparatus for the collimation at infinity of two images originating from a first and a second separate luminous sources which emit in two different spectral bands, in which system the two images are reflected by two different surfaces and projected on a semi-transparent imaging means, characterized by the fact that the reflection of the first of these images is obtained by a dichroically treated first surface which reflects this image and permits passage of the second image, which is refracted by the above mentioned first surface, subsequently reflected by a second surface, and once again refracted by the first surface; the above mentioned surfaces being oriented in such a way that the two images are precisely superimposed upon the imaging means.

2. An apparatus as claimed in claim 1 in which of said two surfaces, the first is constituted by a fixed dichroic filter whose faces are parallel to one another and the second by a reflecting surface which is angularly mobile with respect to the dichroic filter whereby the second image projected upon said imaging means can be moved with respect to the first image projected upon the same imaging means; the above mentioned two luminous sources and the imaging means being all located on the same side of the two above mentioned screens with respect to said filter and said reflecting surface; the second luminous source being situated in an intermediate position between the first light source and the imaging means in such a way that the beam coming from the second source is included within the angle formed by the beam emitted by the first source and this same beam as reflected by the prism and directed toward the imaging means.

3. An apparatus as claimed in claim 2 for use with aircraft in which apparatus the first luminous source comprises a cathode ray tube screen subservient to a calculator, upon which are presented images useful for piloting and sighting; the second light source is the projector of an invariable image which is used for the purpose of aiming weapons; the imaging means is a semi-transparent glass upon which are projected the superimposed and respectively shifted images of the cathode ray tube screen and of the projector; said apparatus comprising also a collector lens interposed between the first source and the prism, and a lens arrangement interposed between the prism and the imaging means; the surface of the cathode ray tube screen coinciding with the focal plane of the optical system which includes the above mentioned lens arrangement and the collector lens; the plane which bears the image of the projector coinciding with the focal plane of the lens itself; the optical axes of the two sources of light being contained within the same plane; in which apparatus the displacements of the second source occur only in a direction which lies in the same plane as the above mentioned optical axes.

4. An apparatus as described in claim 1 in which the two specified surfaces are those of a single prism, and in which the two luminous sources and the semi-transparent imaging means are all situated on the same side of the prism; the above mentioned second source being situated between the first source and the imaging means so that the beam of light originating at the second source is included within the angle formed by the beam emitted by the first source and by the same beam reflected by the prism and directed toward the imaging means.

5. An apparatus as per claim 4 intended for aircraft use, in which apparatus the first luminous source is a cathode ray tube screen subservient to a calculator, upon which are presented images which are useful for piloting and aiming purposes; the second source is a projector of an invariable image which is utilized for the aiming of weapons,and the imaging means is a semi-transparent glass plate upon which are projected the superimposed images of the cathode ray tube screen and the screen of the projector; the above apparatus including also a collector lens situated between the first source and the prism and a lens arrangement located between the prism and the imaging means; the surface of the cathode ray tube screen coinciding with the focal plane of the optical system which includes said arrangement and said collector lens; the plane which bears the image of the projector coinciding with the focal plane of said lens arrangement; the optical axes of the two sources being contained within the same plane.

6. An optical system for collimation to infinity as claimed in claim 4 and characterized by the fact that the mobile surface which reflects the second image is made to move along the curve of an ellipse whose foci coincide with the center of the focal plane of the projector and with the second nodal point of the lens, so that in any tangential position of the mobile surface itself along the elliptical curve, the same focal distance results whereby a proper focus of the second image is obtained without the formation of parallax between the two projected images.

* * * * *